United States Patent

Jaeger

[15] 3,640,489

[45] Feb. 8, 1972

[54] VERTICAL TAKEOFF AND LANDING AIRCRAFT

[72] Inventor: Karl Jaeger, Im Stillen Winkel 21, 43 Essen-Margarethenhohe, Germany

[22] Filed: July 28, 1969

[21] Appl. No.: 845,242

[30] Foreign Application Priority Data

July 26, 1968 Germany..................P 17 56 879.5

[52] U.S. Cl. .........................................244/23 C
[51] Int. Cl. .........................................B64c 29/00
[58] Field of Search................244/12, 23, 3.24; 239/265.35

[56] References Cited

UNITED STATES PATENTS

| | | | |
|---|---|---|---|
| 3,238,875 | 3/1966 | Stadler et al............................ | 244/3.24 |
| 3,390,899 | 7/1968 | Herbert et al......................... | 239/265.35 |
| 3,416,754 | 12/1968 | Pinaire et al.......................... | 239/265.35 |
| 2,947,496 | 8/1960 | Leggett.................................... | 244/12 |
| 2,990,137 | 6/1961 | Willis....................................... | 244/12 |
| 3,082,977 | 3/1963 | Arlin......................................... | 244/12 |
| 3,162,011 | 12/1964 | Mullins et al. ........................... | 244/23 |
| 3,465,989 | 9/1969 | Bowshier................................. | 244/23 |

Primary Examiner—Trygve M. Blix
Assistant Examiner—Steven W. Weinrich
Attorney—Karl F. Ross

[57] ABSTRACT

A vertical takeoff and landing (VTOL) aircraft has a discus-shaped fuselage with a plurality of angularly equispaced lift-generating assemblies. Each assembly comprises a rotor above or flush with the fuselage, a compressor in the fuselage drawing air in from above, and a nozzle below the fuselage for expelling the air from the compressor in a jet. The nozzles can be rotated to point in any direction. Thus, according to the settings of the nozzles, the aircraft can rise or sink vertically and move in any horizontal direction.

7 Claims, 4 Drawing Figures

PATENTED FEB 8 1972

3,640,489

INVENTOR.
KARL JAEGER
BY
Karl F. Ross
ATTORNEY

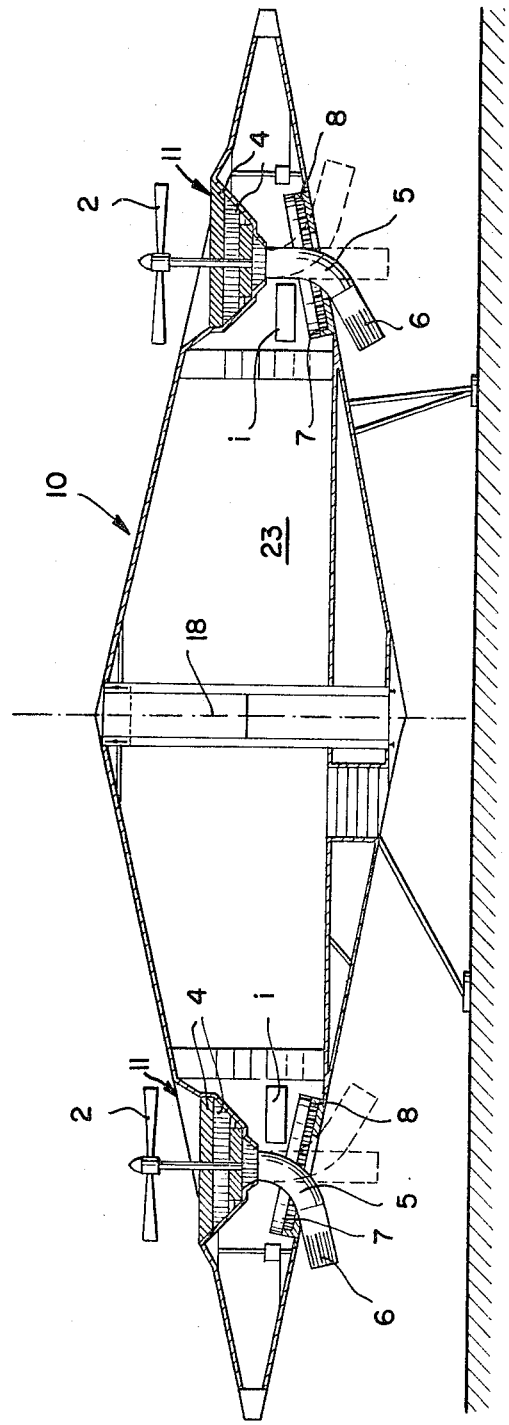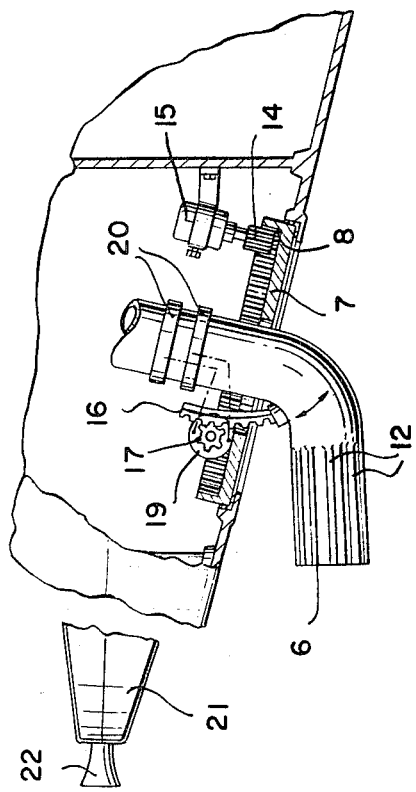

VERTICAL TAKEOFF AND LANDING AIRCRAFT

FIELD OF THE INVENTION

The present invention relates to an aircraft and, more particularly, to an aircraft of the vertical takeoff and landing (VTOL) type.

BACKGROUND OF THE INVENTION

There are two general types of aircraft: those which use air currents passing over relatively fixed airfoils for lift, and those using substantially horizontal fans or screws to mount in the air. Both types offer particular advantages and disadvantages. The conventional airplane is relatively inexpensive and can attain great speeds with large payloads; however, it requires extensive takeoff and landing facilities and is adversely affected by many wind conditions. Those aircraft of the helicopter type can take off and land vertically on any more or less flat and solid surface; but they are very expensive, can only attain relatively low cruising speeds, and cannot carry large payloads.

Solutions to the above-mentioned difficulties have been attempted in the form of hybrid aircraft supposedly combining the advantages of the two types while obviating their disadvantages. One such essay is an aircraft equipped with horizontally oriented screw propellers that are used only on takeoff and landing and are folded back during normal flight wherein conventional wings and vertically oriented fans are used. Sometimes the entire wing-and-propeller assembly is rotatable through 90° to make this possible. Such an aircraft has certain advantages, yet it still uses the principle of lift generated by airflow over an airfoil for conventional flight and has, therefore, several disadvantages. Namely, such a vehicle must attain a certain horizontal velocity before it can be converted from one mode to the other, a speed often very difficult to obtain with the means at hand. Furthermore such aircraft are complicated and expensive in the extreme and, thus, troublesome and often dangerous.

OBJECTS OF THE INVENTION

It is, therefore, the general object of the present invention to provide an improved aircraft.

A more specific object is to provide an aircraft of the VTOL type which overcomes the disadvantages of the above-described aircraft.

SUMMARY OF THE INVENTION

The above objects are attained, in accordance with some of the features of the present invention, by an aircraft having a discus-shaped fuselage mounting a plurality of circumferentially spaced lift-generating assemblies and thereby being a sort of flying saucer. Each assembly comprises a rotor above or flush with the fuselage and oriented in a generally horizontal plane, means for rotationally driving the rotor, preferably in the form of a radial-piston engine, and a compressor below each rotor sucking air in from above and expelling it below through a nozzle. Control means is provided to turn the nozzles individually or jointly in any substantially horizontal direction and to turn them through substantially 90° so that they can point straight down, or off to any side.

Such an aircraft can take off or land vertically, the lift being generated substantially by the rotors and by the air being expelled in high-pressure jets from the bottom of the aircraft. Once airborne, the craft can be displaced horizontally by pointing the nozzles back, in the direction of travel. Simple alteration of motor speed and orientation of the nozzles thus controls the craft fully. The rotors above the fuselage virtually eliminate drag during takeoff, and permit such takeoff regardless of wind direction.

According to an important feature of this invention, the fuselage is defined between an upper and a lower conical surface (of the upper and lower halves of the airframe) centered on the vertical axis of the aircraft so that the fuselage tapers radially outward, the structure having its center of gravity located along the vertical axis and preferably at the lower third of the latter so that disturbances of the aircraft in flight, e.g., as a result of air turbulence will immediately result in a compensating movement of the aircraft to restore its horizontal position with the center of gravity located in the same vertical line with the top of the aircraft. It is important also to note that the lift-generating means act along the upper surface of the fuselage and thereby provides a lever type of action to restore aircraft stability.

An important aspect of this invention resides in the provision, in addition to airscrews (propellers), lift-generating fans with air increase formed by openings in the upper conical surface of the fuselage while the nozzles discharge high-velocity jets of air along the lower conical surface. The advantages of an arrangement of this type are that it may make use in a novel manner, of principles which have already been recognized in fixed-wing aircraft. Thus it is known to reduce the viscous drag or air resistance along the leading edge and upper skin of a fixed airfoil by providing openings in the latter through which the boundary layer is drawn and discharged below the airfoil or at its trailing edge, thereby eliminating the turbulence along the airfoil surfaces and increasing both propulsion and lift efficiency. In accordance with this principle, the fans draw air from along the upper surface and feed the air to the nozzles directly or through a compressor which may be driven on the same shafts as the fans, turbulence along the upper surface of the fuselage is minimized and air resistance reduced. The fans, moreover, may alternate with individual airscrew arrangements and/or pairs or triplets of such airscrews and may be driven by any convenient prime movement. The airscrews or propellers are advantageously spaced above the surface so that immediately below that there may be provided the open mouth or inlets of the compressors which are coupled with the propellers.

I have found, most surprisingly, that high stability can be assured and simple steering or rudder control accomplished by providing the discharge nozzles as flexible ducts whose upper portions extend axially and thus are aligned with the shafts of the respective compressors, propellers and fans, while the lower portion of each duct is bent in a form of an elbow to provide a discharge and extending generally radially with respect to the axis of the upper portion of the duct. The elbow is lodged in a control disk which is generally planar and lies along the upwardly and outwardly inclined frustoconical underside of the fuselage so as to be rotatable about an axis intersecting the axis of the respective propeller, fan, or compressor and extending perpendicular to the underside of the fuselage. An especially important characteristic of this invention is that the depending portion of the elbow, which extends more or less radially as noted above, is formed with longitudinally extending fins performing a rudder function.

DESCRIPTION OF THE DRAWING

The above and other objects, features, and advantages will become more fully apparent in the following description, reference being made to the accompanying drawing, in which:

FIG. 2 is a section along the line II—II of FIG. 1; and

FIG. 3 is a vertical section showing details of FIG. 1 in enlarged scale;

SPECIFIC DESCRIPTION

Figure 4:
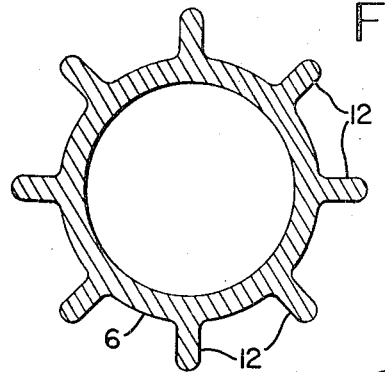
FIG. 4 is a cross section view of the aircraft's rotatable nozzles disclosing the stabilizing fins in enlarged scale.
Figure 1:
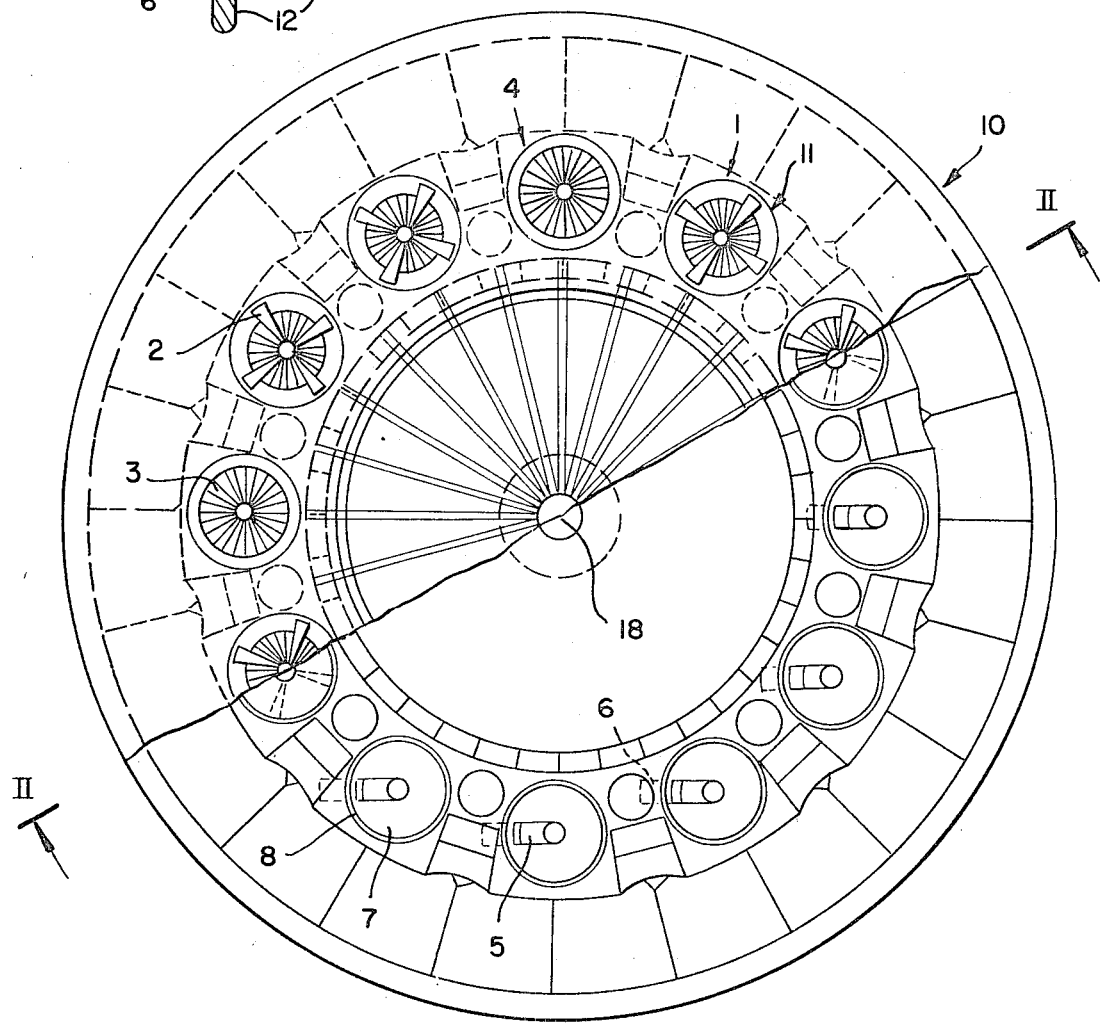
FIG. 1 is a diagrammatic top view partly broken away and partly in section of an aircraft according to the present invention.

As shown in FIGS. 1–3 the aircraft has a fuselage 10 shaped like a discus with upper and lower conical faces, thereby making the craft into a sort of flying saucer. Spaced around this fuselage 10, equidistant from a center axis 18 and angularly equidistant from one another are a plurality, here 12, of lift-generating assemblies 11. Each assembly has a rotor in the form of an airscrew propeller 2 or a lift fan 3, the distribution depending on the size and weight of the craft. The airscrews 2 are substantially above the fuselage 10, while the fans 3 are virtually flush therewith.

Below each rotor, mounted in the fuselage 10, is a compressor 4 which draws air in from below the rotor and expels it through a flexible tube 5. This compressor 4 is mounted on the same shaft with the rotor which is itself driven by a radial-piston engine 1.

FIG. 3 shows more details of the craft. Mounted on the end of the tube 5 is a nozzle 6 provided with longitudinal laterally projecting fins 12 acting as rudders or stabilizers. The tube 5 is fitted through a disk 7 formed with an internal gear 8 which meshes with a pinion 14 on an electric motor 15. This arrangement, with motor 15, allows the nozzles 6 to be pointed in any horizontal direction. The nozzle 6 further mounts an arcuate rack 16 which meshes with a pinion 17 of a motor 19 connected through sliprings 20 to a source of power. This motor 19 adjusts the inclination to the vertical of the nozzle, thereby allowing it to point straight down or, as shown in FIG. 2, to the side.

The fuselage has an extreme edge 21, as shown in FIG. 3, which may carry a ramjet 22 used during flight for extra speed.

In order to take off, the nozzles 6 are either pointed straight downward, or directed somewhat inwardly toward one another. Once the vehicle is airborne, the nozzles 6 are directed to a side, all in the same direction, to displace the craft in the opposite direction. The jets 22 along one portion of the edge 21 assist the flight in the horizontal.

The center of gravity of the loaded craft is advantageously held in the lower third of a center region 23. In this manner, the lift caused by the assemblies 11 is distributed all around the load and mostly above it, thereby giving the craft great stability. Indeed, the craft's normal center of gravity is exactly in the center, due mainly to the symmetrical construction, so that this stability is built in. Furthermore, change in speed of any of the motors 1 can be effected to raise or lower an edge of the craft, if desired.

I claim:

1. An aircraft comprising:
  a closed-skin discus-shaped fuselage of circular outline having conical upper and lower halves centered on an axis and defining all of the airfoil surface of the aircraft within said outline, the center of gravity of the aircraft being located along said axis in said lower half;
  a plurality of lift-generating assemblies spaced around said fuselage, each of said assemblies including a respective rotor rotatable along the top of said fuselage, means for rotationally driving said rotor, a respective compressor in said fuselage below said rotor drawing in and compressing air from below said rotor, and a respective nozzle connected to said compressor to expel from below said fuselage the air compressed thereby, said nozzles projecting downwardly below said fuselage and exclusively forming rudder controls for said aircraft; and
  control means for selectively directionally orienting each of said nozzles, each of said control means including a rotatable disk mounted on and substantially flush with the lower surface of said fuselage, said nozzle being formed at the lower end of a fixed-elbow tube rising through the disk to the compressor, and drive means connected to said disk for rotating same and thereby rotating said nozzle.

2. The aircraft defined in claim 1 wherein each of said control means further includes means for orienting the respective tube and nozzle in a vertical plane.

3. The aircraft defined in claim 1 wherein said rotor is an airscrew spaced above said fuselage.

4. The aircraft defined in claim 1 wherein said rotor is a fan substantially flush with the upper surface of the fuselage.

5. The aircraft defined in claim 1 wherein said nozzles are formed with longitudinal fins below said fuselage.

6. The aircraft defined in claim 1 further comprising a shaft, said rotor and said compressor being mounted on said common shaft and said means for rotationally driving said rotor thereby also driving said compressor.

7. The aircraft defined in claim 1 wherein said assemblies are angularly equispaced around said fuselage.

* * * * *